United States Patent
Komatsu et al.

(10) Patent No.: US 8,258,209 B2
(45) Date of Patent: Sep. 4, 2012

(54) INSULATING RESIN COMPOSITION AND APPLICATION THEREOF

(75) Inventors: Shintaro Komatsu, Tsukuba (JP); Mitsuo Maeda, Tsukuba (JP); Hiroshi Harada, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 287 days.

(21) Appl. No.: 12/230,424

(22) Filed: Aug. 28, 2008

(65) Prior Publication Data
US 2009/0069483 A1 Mar. 12, 2009

(30) Foreign Application Priority Data

Sep. 12, 2007 (JP) ................................. 2007-236374
May 8, 2008 (JP) ................................. 2008-122025

(51) Int. Cl.
*C08K 3/22* (2006.01)
*C08K 7/04* (2006.01)
*C08K 7/18* (2006.01)
*C08L 101/00* (2006.01)

(52) U.S. Cl. ........ 523/513; 524/430; 524/437; 524/495; 524/496

(58) Field of Classification Search ............... 523/513; 524/430, 437, 495, 496
See application file for complete search history.

(56) References Cited

U.S. PATENT DOCUMENTS

| 2,513,188 | A | | 6/1950 | Macallum | |
|---|---|---|---|---|---|
| 3,274,165 | A | | 9/1966 | Lenz et al. | |
| 4,161,470 | A | | 7/1979 | Calundann | |
| H001332 | H | * | 7/1994 | Deakyne et al. | 428/297.4 |
| 5,830,566 | A | * | 11/1998 | Kimura et al. | 428/323 |
| 6,120,894 | A | | 9/2000 | Yamamoto et al. | |
| 2002/0055607 | A1 | * | 5/2002 | Okamoto et al. | 528/182 |
| 2007/0225420 | A1 | * | 9/2007 | Komatsu et al. | 524/437 |
| 2008/0021146 | A1 | * | 1/2008 | Komatsu et al. | 524/437 |

FOREIGN PATENT DOCUMENTS

| EP | 704414 A1 | * | 4/1996 |
|---|---|---|---|
| JP | 44-27671 | | 11/1969 |
| JP | 47-47870 | | 12/1972 |
| JP | 62-100577 | | 5/1987 |
| JP | 63-3888 | | 1/1988 |
| JP | 3-212454 | | 9/1991 |
| JP | 8-91954 | | 4/1996 |
| JP | 08-283456 | | 10/1996 |
| JP | 08283456 A | * | 10/1996 |
| JP | 09-157403 | | 6/1997 |
| JP | 2002-146003 | | 5/2002 |

* cited by examiner

*Primary Examiner* — Kelechi Egwim
(74) *Attorney, Agent, or Firm* — Foley & Lardner LLP

(57) ABSTRACT

The present invention provides a resin composition comprising: (A) a thermoplastic resin, (B) a granular material which has a number average particle diameter of 0.5 to 5 mm and is obtainable by granulating a fiber mainly having alumina with a number average fiber diameter of 1 to 50 μm, and (C) a filler composed of a material of which electric resistivity at 300 K is $10^2$ Ωm or less. The resin composition can be molded into a molded article with electric insulation. The electric resistivity of the molded article has sufficient electric insulation in applications such as in electric and electronic parts.

19 Claims, No Drawings

INSULATING RESIN COMPOSITION AND APPLICATION THEREOF

FIELD OF THE INVENTION

The present invention relates to an insulating resin composition which can provides a molded article for electric insulation having an excellent heat conductive property.

DESCRIPTION OF THE RELATED ART

In recent years, in the field of electric and electronic parts, heat generation inside the parts has caused difficulty in the miniaturization and technical advance thereof. When a means for promoting heat management is insufficient to such heat generation, there is concern that performance of electric and electronic parts may be lowered due to accumulation of heat. In order to deal with the difficulty and ensure safety to heat generation, it is preferred that a member used in electric and electronic parts has a high heat conductive property.

In parts required a high heat conductive property, metal materials have mainly been used so far, but metal materials have drawbacks in weight saving and moldability on adapting miniaturization of part, thus they have been increasingly replaced with resin materials.

There have been variously studies on heat conductive resin compositions that include fillers having high heat conductivity. Using a heat conductive filler in fiber form (fibrous heat conductive filler) in a molded article, the heat conductive path is provided in the article, which can exhibit an excellent heat conductive property. For example, there have been proposed a composition of a thermoplastic resin with a heat conductive filler in which carbon fibers with a specific fiber length are bundled (see, Japanese Unexamined Patent Publication No. (JP-A-)9-157403 (paragraphs [0023] to [0026]); corresponding to U.S. Pat. No. 6,120,894); and a composition of a thermoplastic resin with an aluminum nitride fiber and an inorganic powder with a high heat conductive property (see, JP-A-8-283456 (Claims)).

However, the molded articles obtained from the proposed compositions mentioned above do not always meet the requirements in practical use. For example, the molded articles obtained from the composition disclosed in JP-A-9-157403, in which a heat conductive path is produced mainly from the carbon fiber, may be unsuitable for electric or electronic parts in the electric insulation since the heat conductive path produced from the carbon fiber exhibits electric conductivity. The molded articles obtained from the composition disclosed in JP-A-8-283456 is insufficient in a heat conductive property.

SUMMARY OF THE INVENTION

Under such circumstances, one of objects of the present invention is to provide an insulating resin composition which can provide a molded article with an excellent a heat conductive property and a sufficient electric insulation property in applications to electric and electronic parts.

The inventors of the present invention have keenly studied to achieve the objectives and have accomplished the present invention. The present invention provides a resin composition comprising:
(A) a thermoplastic resin;
(B) a granular material which has a number average particle diameter of 0.5 to 5 mm and is obtainable by granulating a fiber mainly having alumina with a number average fiber diameter of 1 to 50 µm; and
(C) a filler composed of a material of which electric resistivity at 300 K is $10^2$ Ωm or less.

Further, present invention provides a molded article obtainable by molding the resin composition mentioned above.

The resin composition of the present invention is an insulating resin composition, which can be molded by, for example, a known molding method into a molded article with electric insulation. The electric resistivity of the molded article is typically $10^{12}$ Ωm or more, and therefore, the molded article has sufficient electric insulation in applications such as in electric and electronic parts.

From the insulating resin composition of the present invention, a molded article with a high heat conductive property and very excellent electric insulation can be obtained and can be used as electric and electronic parts with such excellent properties. In particular, the molded article is suitable for a member related to electric and electronic parts, and is industrially very useful.

DETAIL DESCRIPTION OF PREFERRED EMBODIMENTS

The resin composition of the present invention comprises:
(A) a thermoplastic resin;
(B) a granular material which has a number average particle diameter of 0.5 to 5 mm and is obtainable by granulating a fiber mainly having alumina with a number average fiber diameter of 1 to 50 µm; and
(C) a filler composed of a material of which electric resistivity at 300 K is $10^2$ Ωm or less.

The component (C) used in the present invention is a filler composed of a material which shows an electric resistivity of $10^2$ Ωm or less when measured at 300 K.

The preferable examples of the filler include a filler composed of material such as metals of Au ($3\times10^{-8}$ Ωm), Ag ($2\times10^{-8}$ Ωm), Cu ($2\times10^{-8}$ Ωm) and the like, silicon carbide ($1\times10^{-6}$ Ωm) and graphite ($1\times10^{-5}$ Ωm), and a carbon fiber ($3\times10^{-6}$ Ωm). In particular, it is preferred to use a filler composed of silicon carbide, a filler composed of graphite or a carbon fiber filler. Herein, the values above in parenthesis each represent the value of electric resistivity measured at 300 K.

The filler composed of silicon carbide is preferably a granular filler (silicon carbide particle) with a number average particle diameter of 0.1 to 30 µm, preferably of 0.5 to 20 µm and more preferably of 1 to 10 µm. When the particle diameter is in the range of from 0.1 to 30 µm, the surface of the resulting molded article tends not to be noticeably degraded. Therefore, the molded article with an excellent appearance tends to be obtained, and an improvement effect of heat conductive property becomes sufficient. Further, when the particle diameter is in this range, there is an advantage that moldability of insulating resin composition becomes excellent.

Examples of the silicon carbide particle include OY series (trade name: manufactured by Yakushima Denko Co., Ltd.).

A preferable carbon fiber includes a pitch-based carbon fiber. The carbon fiber may have a heat conductivity of 100 W/mK or more when measured at a temperature of 300 K, preferably has a heat conductivity of 120 W/mK or more, and more preferably has a heat conductivity of 200 W/mK or more. The carbon fiber preferably has a fiber diameter of 1 to 20 µm, and more preferably has a fiber diameter of 5 to 15 µm.

Examples of such a carbon fiber include Dialead (manufactured by Mitsubishi Plastic Inc.) and Granock (manufactured by Nippon Graphite Fiber Corporation).

The graphite may be a natural graphite or may be a man-made graphite. A natural graphite is preferable. A shape of a filler composed of such graphite (graphite filler) may be lepidic or spherical. The graphite filler preferably has a number average particle diameter of 30 to 300 μm, and more preferably has a number average particle diameter of 30 to 100 μm. The number average particle diameter of from 30 to 300 μm is preferred, since the balance of high heat conductivity and moldability of the resulting resin composition is excellent when the graphite filler is compounded in a thermoplastic resin, particularly in a liquid crystal polyester described below. The number average particle diameter can be easily determined by using a measuring method of laser-diffractive particle size distribution. Based on the number average particle diameter obtained by the method of laser-diffractive particle size distribution, a suitable graphite filler to be used in the present invention can be selected.

Examples of the graphite filler easily commercially available include a lepidic graphite powder or spheroidized graphite powder (both manufactured by Nippon Graphite Industries Co., Ltd.) and lepidic graphite (manufactured by Nishimura Graphite Inc, Ltd.).

Among these exemplified graphites, the lepidic graphite is preferably used, because the resulting resin composition has superior moldability. The lepidic graphite has an advantage in view of cost, since it is cheaper than granular graphite.

It is known that heat conductivity of substance is inversely proportional to electric resistivity. When a material with a low electric resistivity (low electric resistivity material) such as a metallic material or a carbon fiber is used as a high heat conductive filler, there is a tendency that electric insulation of the resulting molded article is degraded. Therefore, for electric and electronic parts conventionally requiring electric insulation, use of the low electric resistivity material has been limited. On the other hand, the present invention provides a resin composition which can be made into a molded article utilizing a high heat conductive property of a filler composed of the low electric conductivity material while maintaining a sufficient electric insulation. In the present invention, by using a filler composed of the low electric resistivity material in combination with a component (B) described below, the resulting molded article has advantages such that electric insulation and heat conductive property are compatible at high levels.

In the resin composition of the present invention, the fillers composed of the low electric resistivity material are preferably used in the same concentration as or the lower concentration than the concentration (percolation concentration) at which the fillers contact each other to form an electrically conductive path, and the component (B) is efficiently disposed in among the fillers composed of the low electric resistivity material. As a result, a heat conductive path is constituted with both the component (B) of material granulating a fiber mainly having alumina and the component (C) of low electric resistivity materials, to exhibit a high heat conductive property while maintaining electric insulation of the heat conductive path.

Further, even when a heat conductive path is produced in such a manner that the fillers composed of the low electric resistivity material are connected each other with a suitable electric insulator, there may be concern that so-called tree dielectric breakdown occurs between the fillers composed of the low electric resistivity material, and dielectric strength voltage of the resulting molded article becomes noticeably low. However, regarding a molded article obtained from the insulating resin composition of the present invention, surprisingly, such dielectric breakdown is suppressed very sufficiently, and an excellent effect in which a dielectric strength voltage necessary for electric and electronic parts (dielectric breakdown voltage: 1 kV/mm or more) can be easily achieved can be exhibited.

The mixing amount of the component (C) is, as described above, suitably chosen so that it is a percolation concentration or less in a molded article obtained, and it is necessary to optimize the mixing amount of the component (C) based on the kind of component (A) for controlling the mixing amount in the percolation concentration or less. As a preferable mixing amount of the component (C) based on the component (A), the component (C) is preferably 1 to 50 parts by weight, more preferably 1 to 40 parts by weight, and further preferably 5 to 40 parts by weight based on 100 parts by weight of a thermoplastic resin of component (A). When the mixing amount of the component (C) is in the above range, electric insulation is sufficiently maintained, and a molded article with a heat conductive property of higher level can be obtained.

The resin composition of the present invention comprises a granular material (component (B)) which has a number average particle diameter of 0.5 to 5 mm and is obtainable by granulating a fiber mainly having alumina with a number average fiber diameter of 1 to 50 μm.

Herein, granularity in the term "granular material" means that the material is a particle shape and has an aspect ratio (which is a ratio of the length of major axis to the length of the minor axis of the material) in the range of from 1 to 2. The "number average particle diameter" is a value obtained by an arithmetic average of the values in which measurements of 100 or more of a granular material are carried out for the major axis and minor axis in an external observation of the granular material by a scanning electron microscope or an optical microscope. Please note that a number-average fiber diameter of a fibrous filler can be obtained in such a manner that 1000 or more of measurements of fiber are photographed and binarized by an image processing device.

The granular material, component (B), is a material that is obtainable by granulating a fiber mainly having alumina (such as alumina fiber). By a synergetic effect of such granular material and the component (C), electric insulation and heat conductive property are compatible at a high level.

The fiber "mainly having alumina" is a fiber preferably contains about 50% by weight or more of alumina, i.e. aluminum oxide ($Al_2O_3$). The content of alumina is more preferably about 70% by weight or more in the fiber, and most preferably about 90% by weight or more.

The fiber mainly having alumina may further have a component(s) other than alumina such as silica ($SiO_2$).

A number average fiber diameter of the alumina fiber used in the granular material is not limited and may be in the range of from 1 to 50 μm, preferably 1 to 30 μm, and more preferably 1 to 20 μm. When the number average fiber diameter is in the range of from 1 to 50 μm, granulation processability for obtaining the granular material is good, and there is an advantage that a fiber itself is hardly cut in granulation process. When the granular material of alumina fiber having too short diameter is used as the component (B), the improvement effect of heat conductive property tends to be inferior.

The fiber length of the alumina fiber is not limited. A commercially available alumina fiber can be used in the present invention, and the commercially available alumina may have a fiber length of 100 μm to 100 mm, preferably 100 μm to 80 mm, and more preferable 150 μm to 60 mm. When the fiber length is in the range of from 100 μm to 100 mm, moldability of the resulting resin composition of the present invention tends to be excellent, and a high heat conductivity (which is one of the objects of the present invention) is more improved.

Examples of the alumina fiber commercially available include Altex (manufactured by Sumitomo Chemical Co., Ltd.), Denka Alcen (manufactured by Denki Kagaku Kogyou K.K.), Maftec bulk fiber (manufactured by Mitsubishi Plastic Inc.), and Saffil alumina fiber (manufactured by Saffil Japan Ltd.).

It is preferable that the alumina fiber is a fiber with a bulk density of 0.2 to 1 g/cm$^3$, which can be measured in accordance with Japanese Industrial Standards (JIS) K5101-12. When such fiber is used, there is an advantage, in addition to easier production of the granular material, that the heat conductive property of a molded article obtained from the resulting resin composition of the present invention is more improved. The bulk density is more preferably 0.2 to 0.5 g/cm$^3$, much more preferably 0.2 to 0.4 g/cm$^3$, and most preferably 0.2 to 0.35 g/cm$^3$. Although there is a case that an alumina fiber with such bulk density becomes floccose, it can become a granular material in the granulation step described below in preparing the resin composition of the present invention, resulting in having a better operability.

By granulating the alumina fiber, the granular material of component (B) can be obtained. Examples of the granulation method include known methods such as stirring granulation, vibrating granulation and milling granulation. Among them, stirring granulation is preferable. Examples of the stirring machine applied to the stirring granulation include a tumbler, Nauta mixer, ribbon type mixer and Henschel mixer. Among them, Henschel mixer is preferable from a viewpoint of short-time treatment.

As mentioned above, the number average particle diameter of the granular material is in the range of from 0.5 mm to 5 mm, and is preferably 1 mm to 2 mm, more preferably 1 mm to 1.5 mm. When the number average particle diameter is 0.5 mm or more, workability, particularly workability in obtaining the resulting resin composition becomes good. When the number average particle diameter is 5 mm or less, dispersibility of granular material in melt resin becomes good in obtaining a molded article by melting the resin composition, both resulting in good moldability. To obtain a granular material with such number average particle diameter, treatment conditions differ depending on the stirring machines, and typically, they can be controlled by stirring speed and stirring time, and the maximum condition can be obtained through preliminary experiments. Further, after such granulation, it is possible to obtain a granular material with a number average particle diameter of 0.5 to 5 mm by removing fine particles and coarse particles through classification operation. Examples of the classification operation include a classification operation using a Dorco sizer, a siphon sizer, a rake classifier, a spiral classifier or the like as a wet classification operation; and a classification operation using a centrifugal classifier, an inertial classification, a sieve or the like as a dry classification operation.

The stirring granulation may be conducted by a known method, the example of which include a method using the above stirring machines for granulation of powder, a method in which an alumina fiber is mixed in a suitable solvent followed by stirring and drying, and a method of stirring by a mixer or the like while spraying a suitable solvent followed by drying. Further, it may be a method of stirring by a mixer or the like while spraying a suitable solvent onto an aggregate of alumina fibers followed by drying. In the method, a solvent such as water, an organic solvent or a mixture thereof can be used. Preferably, it is suitable that water or a water/organic solvent mixture in which water is a main component is used as a solvent. Among the solvents, water is more preferable.

In stirring granulation of the present invention, a converging agent may be contained in the solvents.

The converging agent, such as a coupling agent, is not particularly limited, and various kinds can be used. Examples of the converging agent include silane-based and titanate-based coupling agents.

Examples of the silane-based coupling agent include such as γ-mercaptopropyltrimethoxysilane, 2-styrylethyltrimethoxysilane, N-β-(aminoethyl)γ-aminopropyltrimethoxysilane, γ-(3,4-epoxycyclohexyl)ethyltrimethoxysilane, γ-gylcidoxypropyltrimethoxysilane, phenyltrimethoxysilane, methyldimethoxysilane, and these can be used alone, or in combination of two or more kinds.

Examples of the titanate-based coupling agent include such as isopropyltriisostearoyl titanate, isopropyltrioctanoyl titanate, isopropyltri(dioctylpyrophosphate)titanate, isopropyltridimethacrylisostearoyl titanate, isopropyltri(N,N-diaminoethyl)titanate, isopropyltridodecylbenzenesulfonyl titanate, isopropylisostearoyldiacryl titanate, isopropyltri(dioctylphosphate)titanate, isopropyltricumylphenyl titanate, tetraisopropylbis(dioctylphosphate)titanate, tetraoctylbis(didodecylphosphate)titanate, tetra(2,2-diallyloxymethyl-1-butyl)bis(ditridecyl)phosphate titanate, bis(dioctylpyrophosphate)oxyacetate titanate, bis(dioctylpyrophosphate) ethylene titanate, and these can be used alone, or in combination of two or more kinds. Further, a silane based coupling agent can be used in combination with a titanate based coupling agent.

The content of coupling agent may be 5 parts by weight or less, and preferably 2 parts by weight or less based on 100 parts by weight of the total amount of the alumina fibers. In a granular material of the present invention, improvement of heat conductive property by a converging agent such as the coupling agent may be hardly observed, whereas when the amount of the coupling agent is too large, it is not preferable because heat conductivity and mechanical property of a molded article obtained from the resulting resin composition tend to be lowered. However, the granular material obtained from the fibrous filler treated with a small amount of coupling agent may be used from the viewpoints that such a granular material increases an affinity with a resin to be mixed, and improves a feeding property in molding the resulting resin composition.

While the granular material of component (B) is thus obtained, the component (B) may be adjusted by a classification operation to have a number average particle diameter preferable in the present invention, before the component (B) is used in the resin composition of the present invention.

The mixing amount of the component (B), being used in combination with the component (C), may be set to be in the range exhibiting heat conductive property of high level and electric insulation. On the basis of 100 parts by weight of the thermoplastic resin, component (A), the component (B) is preferably used in the range of form 10 to 400 parts by weight, more preferably 10 to 300 parts by weight. When the mixing amount of component (C) is in the range of form 10 to 400 parts by weight, both electric insulation and heat conductive property can be compatible at a high level.

The thermoplastic resin of component (A) used in the is present invention may be a resin that can be molded at a molding temperature (melt temperature) of from 200 to 450° C., and can be used as a electric insulating material. Examples of the thermoplastic resin as component (A) include polyolefin, polystyrene, polyamide, halogenated vinyl resin, polyacetal, saturated polyester, polycarbonate, polyarylsulfone, polyarylketone, polyphenelene ether, polypheneylene sulfide, polyaryletherketone, polyethersulfone, polyphenylene sulfide sulfone, polyallylate, aromatic polyamide, liquid crystal polyester and fluorine resin. The thermoplastic resin can be used alone, or can be used as a polymer alloy composed of two or more kinds of the thermoplastic resins.

Among the thermoplastic resins, preferable resins are liquid crystal polyester, polyethersulfone, polyallylate, polyphenylene sulfide, polyamide 4/6 or polyamide 6T, which are particularly excellent in heat resistance. Among these, polyphenylene sulfide and liquid crystal polyester are particularly preferable, further, from the point of good thin-wall moldability, liquid crystal polyester is more preferable. A liquid crystal polyester with good thin-wall moldability is particularly suitable for preparing a member used in electric and electronic parts having a complicate shape.

Polyphenylene sulfide and liquid crystal polyester as is a suitable thermoplastic resin will be described in more detail below.

Typically, polyphenylene sulfide is a resin mainly including a structural unit expressed by the following formula (10). As a method for producing such polyphenylene sulfide, examples of the method include such as a reaction of a halogen-substituted aromatic compound with alkali sulfide disclosed in U.S. Pat. No. 2,513,188 and Japanese Examined Patent Publication No. 44-27671, a condensation reaction of thiophenols in coexistence of an alkali catalyst, a copper salt or the like disclosed in U.S. Pat. No. 3,274,165, or a condensation reaction of an aromatic compound with sulfur chloride in presence of Lewis acid disclosed in Japanese Examined Patent Publication No. 46-27255. Further, polyphenylene sulfide easily commercially available may be used (for example, polyphenylene sulfide available from Dainippon Ink and Chemicals Inc.).

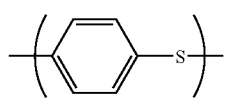

(10)

The liquid crystal polyester used in the present invention is a polyester which may be called a thermotropic liquid crystal polmer, which forms a melt body showing optical anisotropy at 450° C. or less.

The liquid crystal polyester may has a flow-staring temperature of 280° C. or higher. Please note that the flow-staring temperature is a temperature at which a heated melt of the liquid crystal polyester has a melt viscosity of 48000 poises while being extruded from the nozzle and being heated at a raising-temperature rate of 4° C./min under a load of 100. kg/cm².

Examples of the liquid crystal polyester include:
(1) those obtained by polymerization of a combination of aromatic hydroxycarboxylic acids, aromatic dicarboxylic acids and aromatic diols,
(2) those obtained by polymerization of different kinds of aromatic hydroxycarboxylic acids,
(3) those obtained by polymerization of aromatic dicarboxylic acids and aromatic diols, and
(4) those obtained by reacting a crystalline polyester such as polyethylene terephthalate with aromatic hydroxycarboxylic acids.

By using ester-forming derivative thereof, in place of these aromatic hydroxycalboxylic acids, aromatic dicarboxylic acids or aromatic diols, production of a liquid crystal polyester becomes easy, which is preferable.

When aromatic hydroxycarboxylic acids and aromatic dicarboxylic acids intramolecularly having a carboxyl group are used, examples of the ester-forming derivative include those obtained by conversion of the carboxylic acid group to a highly reactive group such as an acid halogen group and an acid anhydride, and esters with alcohols and ethylene glycol that will form polyesters by transesterification. When aromatic hydroxycarboxylic acids and aromatic diols intramolecularly having a phenolic hydroxyl group are used, examples of the ester-forming derivative include esters of the phenolic hydroxyl group with lower carboxylic acids that will form polyesters by transesterification.

The aromatic hydroxycalboxylic acids, aromatic dicarboxylic acids or aromatic diols may have a halogen atom such as chlorine atom and fluorine atom, an alkyl group such as a methyl group and an ethyl group, and an aryl group such as a phenyl group on an aromatic ring to the extent that ester-forming properties thereof are not disturbed so much.

Examples of the structural unit of the liquid crystal polyester of the present invention include the followings:

Structural Units Derived from Aromatic Hydroxycalboxylic Acids:

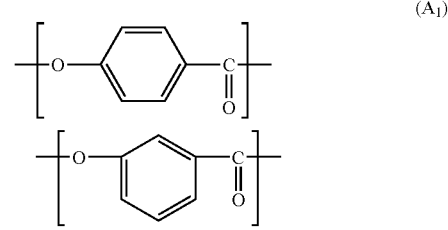

(A₁)

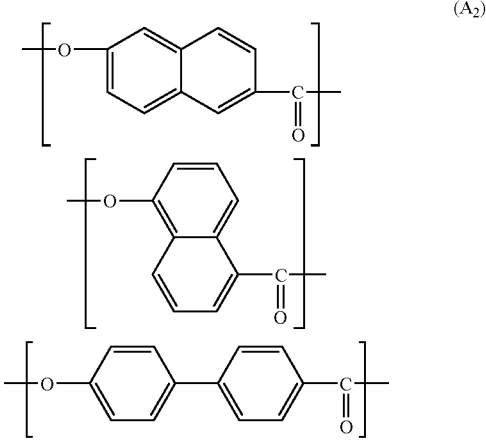

(A₂)

The above structural unit may have a halogen atom, an alkyl group or an aryl group as a substituent.

Structural Units Derived from Aromatic Dicalboxylic Acids:

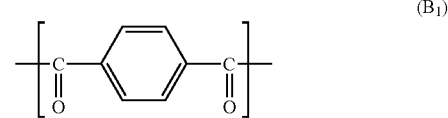

(B₁)

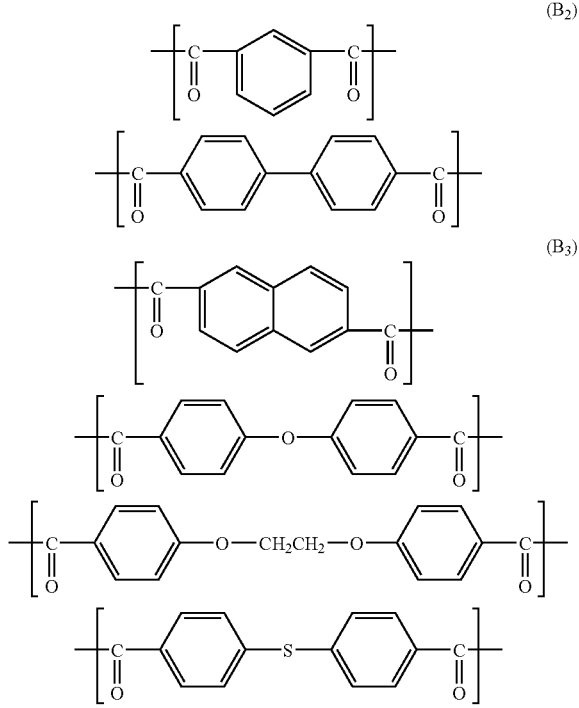

(B₂)
(B₃)

The above structural unit may have a halogen atom, an alkyl group or an aryl group as a substituent.

Structural Unist Derived from Aromatic Diols:

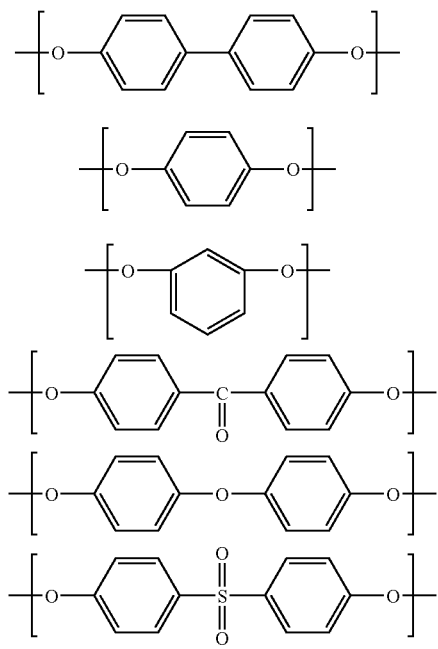

(C₁)
(C₂)
(C₃)

The above structural unit may have a halogen atom, an alkyl group or an aryl group as a substituent.

Examples of the combination of structural units (selected from the units shown above) constituting the liquid crystal polyester include the combinations (a) to (h) below.

(a): a combination of $(A_1)$, $(B_1)$ and $(C_1)$, or a combination of $(A_1)$, $(B_1)$, $(B_2)$ and $(C_1)$, (b): a combination of $(A_2)$, $(B_3)$ and $(C_2)$, or a combination of $(A_2)$, $(B_1)$, $(B_3)$ and $(C_2)$, (c): a combination of $(A_1)$ and $(A_2)$, (d): a combination obtained from the combination of structural units (a) by replacing a part or whole of $(A_1)$ with $(A_2)$, (e): a combination obtained from the combination of structural units (a) by replacing a part or whole of $(B_1)$ with $(B_3)$, (f): a combination obtained from the combination of structural units (a) by replacing a part or whole of $(C_1)$ with $(C_3)$, (g): a combination obtained from the combination of structural units (b) by replacing a part or whole of $(A_2)$ with $(A_1)$, (h): a combination obtained from the combination of structural units (c) by adding $(B_1)$ and $(C_2)$.

From a viewpoint of the balance between heat resistance, mechanical properties and processability, a particularly preferable liquid crystal polyester have the structural unit expressed as the $(A_1)$ in an amount of at least 30% by mole based on the total structural units of the liquid crystal polyester.

Liquid crystal polyesters corresponding to combinations (a) and (b) are disclosed in, for example, Japanese Examined Patent Publication Nos. 47-47870 and 63-3888, respectively, and may be produced by a method disclosed in, for example, Japanese Unexamined Patent Publication No. 2002-146003. For examples, the liquid crystal polyester can be produced by a method comprising the steps of subjecting the monomers (aromatic hydroxycarboxylic acids, aromatic dicarboxylic acids, aromatic diols, or their ester-forming derivatives) to melt polymerization to give an aromatic liquid crystal polyester with a relatively low molecular weight (hereinafter, abbreviated as "prepolymer"), then, making the prepolymer into a powder and heating the powder to cause solid phase polymerization. When such solid phase polymerization is conducted, polymerization proceeds further and a liquid crystal polyester with high molecular weight can be obtained. Further, a method for producing the liquid crystal polyester by combination of melt polymerization and solid phase polymerization can improve a flow-starting temperature of the resulting liquid crystal polyester. In particular, by suitably optimizing the polymerization conditions of solid phase polymerization, it is possible to easily produce a liquid crystal polyester having a desired flow-staring temperature.

The liquid crystal polyester used in the present invention is, from the viewpoint of exhibiting liquid crystallinity, preferably a liquid crystal polyester in which the total of a structural unit derived from p-hydroxybenzoic acid and a structural unit derived from 2-hydroxy-6-naphthoic acid is 30 to 80% by mole based on the total structural units of the liquid crystal polyester; the total of a structural unit derived from hydroquinone and a structural unit derived from 4,4'-dhydroxybiphenyl is 10 to 35% by mole based on the total structural units of the liquid crystal polyester; and the total of a structural unit derived from terephthalic acid, a structural unit derived from isophthalic acid and a structural unit derived from 2,6-naphthalene dicarboxylic acid is 10 to 35% by mole based on the total structural units of the liquid crystal polyester.

The resin composition of the present invention comprises the components (A), (B) and (C). Using the composition, a molded article with electric insulation and high heat conductive property can be obtained. The resin composition of the present invention may further comprise (D) alumina fine particle (component (D)) as a heat conductive filler. The resin composition comprising the alumina fine particle is excellent in more improving heat conductive property. Further, when a liquid crystal polyester is adopted as a thermoplastic resin of component (A), there is a case that the resulting molded article exhibits anisotropy in its heat conductive property. By containing the component (D) as a heat conductive filler, exhibiting such anisotropy in the heat conductive property can be properly reduced.

The alumina fine particle used as component (D) is preferably a fine particle composed of α-alumina, having the content of aluminum oxide ($Al_2O_3$) of 96% by weight or more and a number average particle diameter of 0.1 to 100 μm. The higher the content of aluminum oxide, the more advantageous it is from the viewpoint of heat conductive property, 99% by weight or more is preferable, and 99.5% by weight or more is further preferable. Further, when the number average particle diameter is in the above range, the reason that moldability is excellent is the same as in the component (B), such number average particle diameter is more preferably 0.1 to 70 μm, further preferably 0.1 to 50 μm, and particularly preferably 0.1 to 20 μm. Herein, a number average particle diameter is an average obtained by photographing powdered fine particles using a scanning electron microscope and selecting 50 to 100 particles from the photograph to conduct image analysis. Further, the alumina fine particle preferably, when the accumulated particle size distribution is measured, has a narrow particle size distribution of 7 or less in $D_{90}/D_{10}$ when 10% accumulative particle diameter and 90% accumulative particle diameter from the fine particle side are defined as $D_{10}$ and $D_{90}$, respectively. $D_{10}$ and $D_{90}$ are measured, for example, by a measuring method of laser diffractive particle size distribution using a Mastersizer (manufactured by Malvern Instruments Ltd.).

As long as the alumina fine particle satisfies the above-mentioned content of aluminum oxide and the above-mentioned number average particle diameter, its shape is not particularly limited. However, spherical, approximately spherical or polyhedral shape is preferable. Further, it is preferable that L/S ratio is 1.0 to 3.0 provided that major axis length of the alumina fine particle is L (μm) and minor axis length thereof is S (μm).

The alumina fine particle may be a commercially available alumina fine particle. Examples of the commercially available alumina fine particle include Sumikorandom manufactured by Sumitomo Chemical Co., Ltd. Further, commercialized products such as alumina fine particles manufactured by Showa Denko K.K. or alumina fine particles manufactured by Nippon Light Metal Co., Ltd. can be used as component (D).

When component (D) is contained in the resin composition of the present invention in addition to components (A) to (C), component (D) is used preferably in the amount of from 5 to 250 parts by weight, more preferably 10 to 200 parts by weight, and most preferably 20 to 150 parts by weight, based on 100 parts by weight of the component (A).

When component (D) is used in the amount of from 5 to 250 parts by weight, there is an advantaget that the improvement effect of heat conductive property is quite excellent, and further moldability is not noticeably damaged.

As mentioned above, the resin composition of the present invention contains components (B) and (C), or components (B), (C) and (D), together with the component (A), and provides a molded article exhibiting a high heat conductive property.

The molded article can be produced by various known methods. Examples of the method include extrusion molding, injection molding, press molding and inflation molding.

Further, in the resin composition of the present invention, within a range which does not damage the effect intended by the present invention, one kind or more of ordinary additives may be added in use, including a filler such as a glass fiber, a fluorine resin, a mold-releasing agent such as a metal soap, a coloring agent such as a dye and a pigment, an antioxidant, a heat stabilizer, a UV absorber, an antistatic agent, a surfactant and the like. Further, one kind or more of substances having an external lubricating effect may be added in use, such as higher fatty acid, higher fatty acid ester, higher fatty acid metal salt and fluorocarbon based surfactant.

The preparation method of insulating resin composition of the present invention is not particularly limited, and examples thereof include a method in which a combination of components (A) to (C), or a combination of components (A) to (D) is mixed using a Henschel mixer, a tumbler or the like, then melt kneaded using an extruder. Further, the examples include a method in which in melt kneading by an extruder, component (A) is fed from a first feed, and after other components were mixed using a Henschel mixer, a tumbler or the like, they are fed from a is side feed, and melt kneaded.

The resin composition thus obtained can choose a suitable molding method depending on the shape of a target part, above all, injection molding is preferable. Regarding the molded article obtained by injection molding, a molded article with a complicate shape such as a thin-wall part can be obtained.

The molded article obtained by the above manner can be a molded article in which electric resistivity at 300 K is $10^{12}$ Ωm or more, and dielectric breakdown voltage at 1 mm thick is 2 kV/mm or more. Such molded article has a heat conductive property of high level, despite a filler with low electric resistance represented by component (C) is used, it exhibits excellent electric insulation and sufficient dielectric breakdown voltage as electric and electronic parts, thus it is very useful in applications related to such parts.

Additionally, after a molded article with a size of 64 mm×64 mm×3 mm thick is obtained from the insulating resin composition of the present invention, the molded article is measured for electric resistivity on the basis of ASTMD257.

Further, after a molded article with a size of 64 mm×64 mm×1 mm thick is obtained from the insulating resin composition of the present invention, the molded article is measured for dielectric breakdown voltage using a short-time breakdown test described in JIS C2110.

As a preferable application of a molded article from the resin composition of the present invention, the following applications can be exemplified below.

As the application of a molded article from the insulating resin composition of the present invention, it is suitable for applications including housing for electric and electronic devices, and parts of an electric equipment such as a generator, a motor, a transformer, an alternator, a voltage regulator, a rectifier, an inverter, a relay, an electric junction, a switch, a breaker, a knife switch, a pole rod, an electric part cabinet, a socket and a relay case. Further, it is suitable for electronic parts generating heat in operation typified by a sensor, a LED lamp, a lamp socket, a lamp reflector, a lamp housing, a connecter, a small-size switch, a coil bobbin, a condenser, an oscillator, various terminal strips, a transformer, a plug, a printed board, a small-size motor, a magnetic head base, a power module, hard desk drive parts (a hard desk drive hub, an actuator, a hard desk substrate etc.), DVD parts (optical pickup etc.) and computer-related parts.

Further, it can be applied to encapsulation resins for a semiconductor element, coil and the like, optical parts for optical equipment such as camera, parts generating high friction heat such as roller bearing, radiating members for car and vehicle-related parts, and an electric component insulating plate.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Applications Nos. 2007-236374 filed on Sep. 12, 2007 and 2008-122025 filed on May 8, 2008, including specification, claims and summary, are incorporated herein by reference in their entirety.

EXAMPLES

The present invention is described in more detail by following Examples, which should not be construed as a limitation upon the scope of the present invention.

The followings were used as component (C).

Silicon carbide 1: OY-3, manufactured by Yakushima Denko Co., Ltd.

Carbon fiber 1: Dialead K223HG, manufactured by Mitsubishi Plastic Inc.

Graphite 1: CB-150, manufactured by Nippon Graphite Fiber Corporation

The followings were used as component (D).

Alumina fine particle 1: Advanced alumina AA-18, manufactured by Sumitomo Chemical Co., Ltd., a number average particle diameter of 18 μm, and an alumina content of 99.6% by weight Alumina fine particle 2: Advanced alumina AA-1.5, manufactured by Sumitomo Chemical Co., Ltd., a number average particle diameter of 1.5 μm, and an alumina content of 99.6% by weight Alumina fine particle 3: Low-soda alumina ALM-41, manufactured by Sumitomo Chemical Co., Ltd., a number average particle diameter of 1.5 μm, and an alumina content of 99.9% by weight Alumina fine particle 4: Advanced alumina AA-03, manufactured by Sumitomo Chemical Co., Ltd., a number average particle diameter of 0.3 μm, and an alumina content of 99.6% by weight Production Example 1

[Production Method of Granular Material 1]

An alumina fiber (Denka Alcen manufactured by Denki Kagaku Kogyo K.K., alumina content 100% by weight, number average fiber diameter 3.2 μm, bulk density 0.28 g/cm$^3$) was charged in a Henschel mixer (Super mixer G100 manufactured by Kawata MGF Co., Ltd.), and stirred and granulated to obtain a granular material 1. A number average particle diameter of granular material 1 determined by an optical microscope was 1.0 mm.

Production Example 2

[Production of Liquid Crystal Polyester]

In a reactor equipped with a stirring apparatus, a torque meter, a nitrogen gas-introducing tube, a thermometer and a reflux condenser, charged were 994.5 g (7.2 moles) of p-hydroxybenzoic acid, 446.9 g (2.4 moles) of 4,4'-dihydroxybiphenyl, 299.0 g (1.8 moles) of terephthalic acid, 99.7 g (0.6 moles) of isophthalic acid and 1347.6 g (13.2 moles) of acetic acid anhydride, the inside of the reactor was sufficiently replaced with nitrogen gas, then raised to 150° C. over 30 minutes under a stream of nitrogen gas, and refluxed for 1 hour while keeping the temperature.

Thereafter, it was raised to 320° C. over 2 hours and 50 minutes while distilling away distillated by-product acetic acid and unreacted acetic acid anhydride, thereby to obtain a prepolymer when time point at which an increase in torque was observed was defined as completion of reaction.

The prepolymer obtained was cooled to room temperature, ground by a coarse grinder, then raised to 250° C. from room temperature over 1 hour under a nitrogen atmosphere, further raised to 285° C. from 250° C. over 5 hours, and kept at 285° C. for 3 hours to conduct solid polymerization. The flow-starting temperature of the liquid crystal polyester obtained was 327° C. The liquid crystal polyester thus obtained is represented as LCP1.

Examples 1 to 7 and Comparative Examples 1 to 4

The granular material 1 obtained in Production example 1, liquid crystal polyester obtained in Production example 2, one kind selected from alumina fine particles 1 to 4, silicon carbide 1, carbon fiber 1 or graphite 1 were kneaded at 340° C. by the composition shown in Table 1 using a double-screw extruder of the same direction (PCM-30 manufactured by Ikegai Iron Works, Ltd.) and pelletized. The pellet obtained was subjected to injection molding at a cylinder temperature of 350° C. and a mold temperature of 130° C. using an injection machine (PS40E5ASE model manufactured by Nissei Plastic Industrial Co., Ltd.) to obtain a molded article 1: 126 mm×12 mm×6 mm, a molded article 2: 64 mm×64 mm×3 mm thick, and a molded article 3: 64 mm×64 mm×1 mm thick. A plate of 1 mm in thickness was cut out in vertical (MD) to a major axis direction of the molded article 1 obtained to prepare a sample for heat conductivity evaluation. Using this sample, thermal diffusivity was measured by a thermal constant measuring apparatus of laser flash method (TC-7000 manufactured by Ulvac-Riko Inc.). Specific heat was measured by DSC (DSC7 manufactured by PERKINELMER Japan Co., Ltd.), specific gravity was measured by an automatic specific gravity measuring apparatus (ASG-320K manufactured by Kanto-measure Co, Ltd.). Heat conductivity was obtained from multiplication of thermal diffusivity and specific gravity.

Electric resistivity at 300 K was measured on the basis of ASTMD257 using the molded article 2. Dielectric breakdown voltage was measured using the molded article 3 in a short-time breakdown test described in JIS C2110.

The results are shown in Table 1.

TABLE 1

| | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|
| LCP1 (part by weight) | 100 | 100 | 100 | 100 | 100 | 100 | 100 | 100 | 100 | 100 | 100 |
| Granular material 1 (part by weight), | 256 | 154 | 165 | 210 | 156 | 165 | 195 | | | | |
| Silicon carbide 1 (part by weight), | 23 | | | | | | | | 233 | | |

TABLE 1-continued

| | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|
| Carbon fiber 1 (part by weight) | | 20 | 23 | 26 | 23 | 23 | | | 14 | 107 | |
| Graphite 1 (part by weight) | | | | | | | 14 | | | | 41 |
| Alumina fine particle 1 (part by weight) | | | 26 | | | | | | | | |
| Alumina fine particle 2 (part by weight) | | | | 28 | | | | | | | |
| Alumina fine particle 3 (part by weight) | | | | | 26 | | | | | | |
| Alumina fine particle 4 (part by weight) | | | | | | 26 | | | | | |
| Heat conductivity (MD) (W/mK) | 5.8 | 6.0 | 9.4 | 8.0 | 9.8 | 9.7 | 6.0 | 2.1 | 3.1 | 23.9 | 4.2 |
| Electric resistivity ($\Omega$m) | $4.0 \times 10^{13}$ | $3.0 \times 10^{13}$ | $9.0 \times 10^{12}$ | $9.0 \times 10^{12}$ | $1.0 \times 10^{13}$ | $6.0 \times 10^{12}$ | $3.0 \times 10^{13}$ | $1.0 \times 10^{10}$ | $3.0 \times 10^{13}$ | 13 | $3.0 \times 10^{9}$ |
| Dielectric breakdown voltage (kV/mm) | 10.0 | 3.0 | 4.0 | 4.3 | 3.6 | 4.0 | 3.0 | 0.8 | 2.8 | — | 0.5 |

It has been made clear that regarding the insulating resin compositions of Examples 1 to 7, the resulting molded articles have heat conductivity in MD direction of 5 W/mK or more, exhibiting quite excellent heat conductive property. Further, electric resistivity was all $10^{12}$ $\Omega$m or more, and showed sufficient electric resistance as a insulating member used in electric and electronic parts, and dielectric breakdown voltage was all 2 kV/mm or more, which was quite excellent.

In the resin compositions in Comparative examples 1 and 2 in which a silicon carbide filler or a carbon fiber was used, the heat conductivity of the resulting molded article was not sufficient, and in Comparative examples 3, 4 with a large mixing amount of carbon fibers or graphite, the electric resistivity of the resulting molded article became small, and the electric insulation was insufficient.

Example 8

Polyphenylene sulfide PPS1 (T-3G manufactured by Dainippon Ink and Chemicals Inc.), the granular material 1 obtained in Production example 1, carbon fiber 1 and the alumina particle 2 were kneaded at 300° C. by the composition shown in Table 2 using a double-screw extruder of the same direction (PCM-30 manufactured by Ikegai Iron Works, Ltd.) and pelletized. The pellet obtained was subjected to injection molding at a cylinder temperature of 350° C. and a mold temperature of 130° C. using an injection machine (PS40E5ASE model manufactured by Nissei Plastic Industrial Co., Ltd.) to obtain a molded article 1: 126 mm×12 mm×6 mm, a molded article 2: 64 mm×64 mm×3 mm thick, and a molded article 3: 64 mm×64 mm×1 mm thick. A plate of 1 mm in thickness was cut out in vertical (MD) to a major axis direction of the molded article 1 obtained to prepare a sample for heat conductivity evaluation. Using this sample, thermal diffusivity was measured by a thermal constant measuring apparatus of laser flash method (TC-7000 manufactured by Ulvac-Riko Inc.). Specific heat was measured by DSC (DSC7 manufactured by PERKINELMER Japan Co., Ltd.), specific gravity was measured by an automatic specific gravity measuring apparatus (ASG-320K manufactured by Kanto-measure Co, Ltd.). Heat conductivity was obtained from multiplication of heat diffusivity and specific gravity).

Electric resistivity at 300 K was measured on the basis of ASTMD257 using the molded article 2. Dielectric breakdown voltage was measured using the molded article 3 in a short-time breakdown test described in JIS C2110.

The results are shown in Table 2.

TABLE 2

| | Example 8 |
|---|---|
| PPS1 (part by weight) | 100 |
| Granular material 1 (part by weight) | 190 |
| Carbon fiber 1 (part by weight) | 17 |
| Alumina fine particle 2 (part by weight) | 27 |
| Heat conductivity (MD) (W/mK) | 6.2 |
| Electric resistivity ($\Omega$m) | $1.0 \times 10^{13}$ |
| Dielectric breakdown voltage (kV/mm) | 2.0 |

It has been made clear that regarding the insulating resin composition of Example 8 in which polyphenylene sulfide was used as component (A), the resulting molded article has a heat conductivity of 5 W/mK or more, exhibiting quite excellent heat conductive property, and also has good results of electric resistivity and dielectric breakdown voltage.

What is claimed is:
1. A resin composition comprising:
   (A) a thermoplastic resin;
   (B) a granular material which has a number average particle diameter of 0.5 to 5 mm and is obtained by granulating a fiber mainly having alumina with a number average fiber diameter of 1 to 50 µm; and
   (C) a filler composed of a material of which electric resistivity at 300 K is $10^2$ $\Omega$m or less.

2. The resin composition according to claim 1, wherein the component (C) is contained in the composition in the amount of from 1 to 50 parts by weight on the basis of 100 parts by weight of the component (A).

3. The resin composition according to claim 1, wherein the component (C) is a filler selected from the group consisting of a filler composed of silicon carbide, a filler composed of graphite or a carbon fiber filler.

4. The resin composition according to claim 1, wherein the component (B) is a granular material obtained by granulating a fiber mainly having alumina with a bulk density of 0.2 to 1 g/cm$^3$.

5. The resin composition according to claim 1, wherein the component (B) is a granular material obtained e by granulating a fiber mainly having alumina while stirring.

6. The resin composition according to claim 1, wherein the component (B) is contained in the composition in the amount of from 10 to 400 parts by weight on the basis of 100 parts by weight of the component (A).

7. The resin composition according to claim 1, wherein the component (A) comprises polyphenylene sulfide.

8. The resin composition according to claim 1, wherein the component (A) comprises a liquid crystal polyester.

9. The resin composition of claim 8, wherein the liquid crystal polyester is a liquid crystal polyester having a flow-starting temperature of 280° C. or higher.

10. The resin composition according to claim 8, wherein the liquid crystal polyester is a liquid crystal polyester wherein the total of a structural unit derived from p-hydroxybenzoic acid and a structural unit derived from 2-hydroxy-6-naphthoic acid is 30 to 80% by mole based on the total structural units of the liquid crystal polyester;

the total of a structural unit derived from hydroquinone and a structural unit derived from 4,4'-dihydroxybiphenyl is 10 to 35% by mole based on the total structural units of the liquid crystal polyester; and the total of a structural unit derived from terephthalic acid, a structural unit derived from isophthalic acid and a structural unit derived from 2,6-naphthalene dicarboxylic acid is 10 to 35% by mole based on the total structural units of the liquid crystal polyester.

11. The resin composition according to claim 1, further comprising (D) an alumina fine particle having a number average particle diameter is 0.1 to 100 μm.

12. The resin composition according to claim 11, wherein the component (D) is contained in the amount of from 5 to 250 parts by weight based on 100 parts by weight of the component (A).

13. A molded article obtained by molding the composition according to claim 1.

14. The molded article according to claim 13, wherein the molded article is an article having an electric resistivity at 300 K is $10^{12}$ Ωm or more, and dielectric breakdown voltage at 1 mm thick of 2 kV/mm or more.

15. The resin composition according to claim 1, wherein the component (C) is contained in the composition in the amount of from 5 to 40 parts by weight on the basis of 100 parts by weight of the component (A).

16. The resin composition according to claim 1, wherein the component (B) is contained in the composition in the amount of from 10 to 300 parts by weight on the basis of 100 parts by weight of the component (A).

17. The resin composition according to claim 1, wherein the component (C) is contained in the composition in the amount of from 5 to 40 parts by weight and the component (B) is contained in the composition in the amount of from 10 to 300 parts by weight, both amounts being on the basis of 100 parts by weight of the component (A).

18. The resin composition according to claim 1, further comprising a fluorine resin.

19. The resin composition according to claim 1, wherein the fiber mainly having alumina has an alumina content of about 100%.

\* \* \* \* \*